(12) United States Patent
Okabe

(10) Patent No.: US 6,489,999 B1
(45) Date of Patent: Dec. 3, 2002

(54) TELEVISION RECEIVER

(75) Inventor: Yoshimasa Okabe, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,181

(22) PCT Filed: Jan. 21, 2000

(86) PCT No.: PCT/JP00/00305
§ 371 (c)(1),
(2), (4) Date: Nov. 9, 2000

(87) PCT Pub. No.: WO00/45594
PCT Pub. Date: Aug. 3, 2000

(30) Foreign Application Priority Data

Jan. 28, 1999 (JP) .......................................... 11-020297

(51) Int. Cl.[7] .......................... H04N 11/00; H04N 5/91
(52) U.S. Cl. .......................... 348/460; 348/906; 386/83
(58) Field of Search ................................ 348/460, 473, 348/474, 569, 570, 906, 725, 736; 386/83, 46; 725/37, 38, 39, 50, 55, 58; H04N 11/00, 5/91, 7/00

(56) References Cited

U.S. PATENT DOCUMENTS 5,974,222 A * 10/1999 Yuen et al. .................... 386/46
6,252,630 B1 * 6/2001 Kusumi et al. ............. 348/460
6,344,878 B1 * 2/2002 Emura ......................... 348/460

FOREIGN PATENT DOCUMENTS

JP    5-22673    1/1993
JP    11-27622   1/1999

* cited by examiner

Primary Examiner—Michael H. Lee
(74) Attorney, Agent, or Firm—Wenderoth, Lind & Ponack, L.L.P.

(57) ABSTRACT

A television receiver 100 according to the present invention comprises an analysis means 6 for collating the output from an operation means 5 according to a user with the output from a program stable storage means 2 to detect a break of a program watched by the user; a timetable creation means 11 for creating an operation schedule on the basis of the break; and a control means 13 for controlling reception, recording, and playback, on the basis of the operation schedule created by the timetable creation means 11, such that the last part of the reserved program is recorded and played back utilizing the break just before the next broadcast of the program starts. When the television receiver 100 so constructed receives a TV program reserved, it notifies the user that the reserved program will be broadcast soon, and makes the user grasp the previous story of the program so that he/she can empathize with the program smoothly.

5 Claims, 7 Drawing Sheets

C : broadcast start time of program A
D : actual end time of program A
E : broadcast end time of program A,
    broadcast start time of program B
F : actual end time of program B
G : broadcast end time of program B
P,Q,h : breaks

TELEVISION RECEIVER

TECHNICAL FIELD

The present invention relates to a television receiver having a function of reserving and receiving a serialized TV program to be broadcast over several times.

BACKGROUND ART

Among TV programs, serialized dramas enjoy popularity, attracting a large audience. As a serialized drama has continuity of a story as its important factor, it is a great value of the program that the audience should not miss it. To keep watching a serialized drama, generally a viewer has to remember a day of the week, time, and channel of the program, and operates a television receiver at the predetermined time to watch the program. However, being busy with housework or the like, the viewer possibly misses the drama.

In order to deal with such program, a conventional television receiver utilizes a method of reserving reception of a program by using an electronic program table which is transmitted along with the program from a broadcast station (Japanese Published Patent Application No. Hei. 5-22673).

FIG. 7 is a block diagram illustrating a conventional television receiver 200.

The television receiver comprises a reception section 21 for receiving a program and a program table, a display section 22 for displaying the program and the program table, a program reservation memory 23 for storing the title of a reserved program, and a timer control section 24 for detecting the start time of the reserved program, and controlling the reception section 21 and the display section 22 to start reception.

Hereinafter, the operation of the television receiver 200 will be described.

The reception section 21 receives a program and a program table, and the display section 22 displays the program and the program table. The user selects a program to be reserved from the program table, and the program reservation memory 23 stores the tile of the reserved program. The timer control section 24 search the program table for the start time of the reserved program, and controls the reception section 21 and the display section 22 to start receiving when a built-in clock indicates the start time of the reserved program.

In this way, the conventional television receiver 200 is characterized by that a reservation is made not according to time but according to a program and, therefore, even when the broadcast time of the program is changed, the program table supplied from the broadcast station is altered, and the reception start time is automatically altered according to the program table. By utilizing this function, reception of a predetermined channel is automatically started at the start time of the reserved program, and the user is prevented from forgetting about turning on power to the television or tuning the channel.

However, when the user actually misses a program, he/she doesn't remember the existence of the program. So, even when the broadcast of the program reserved by the user is started automatically by the automatic reception function, the user cannot prepare to watch it in many cases. Further, since many serialized dramas are broadcast at 1-week intervals, the user may forget the story of the program even though he/she remembers the existence of the program. Especially, since a serialized drama starts taking up the last scene of the previous story, the user cannot keep up with the story if he/she doesn't remember the last part of the previous story, and the user's pleasure in watching the drama is considerably spoiled. Although recording the program every time in a VTR helps the user to remember how the story goes by playing back the last part of the previous story, it takes much trouble with the operation of exchanging, rewinding, and playing back the tape. So, if the previous story is played back just before the drama starts, it may make inroads into the broadcast time of the main drama.

The present invention is made to solve the above-described problems, and it is an object of the present invention to provide a television receiver for reserving and receiving a serialized program a user watches every time, which receiver records the last part of the program and plays it back just before the next broadcast of the program by using a break time between programs, which is not related to the reserved program, whereby an advance notice of starting the broadcast of the reserved program is given to the user, and the user can watch the program having a grasp of the previous story and, therefore, the user can easily empathize with the program.

DISCLOSURE OF THE INVENTION

A television receiver according to the present invention (Claim 1) is a television receiver having a function of reserving and receiving a serialized TV program to be broadcast over several times, and this television receiver comprises reception means for receiving a program and a program table which are transmitted from a broadcast station; operation means for generating an operation signal for setting a reservation to receive a predetermined program, according to a predetermined operation; recording/playback means for recording and playing back the received program; program information/receiving time detection means for detecting program information for specifying the predetermined program received by a user, and the receiving time of the predetermined program, on the basis of the operation signal and the program table; display means for displaying the output from the reception means, the recording/playback means, or the program information/receiving time detection means; schedule creation means for creating an operation schedule for reception, recording, and playback of the predetermined program, on the basis of the detected program information and recording time of the predetermined program, and the program table; and control means for controlling the reception means, the recording/playback means, and the display means on the basis of the operation schedule. In this television receiver, when the predetermined program on which a reservation for reception has been set is broadcast, the last part of the broadcast is recorded, and the recorded part of the broadcast is played back just before the next broadcast of the predetermined program is started.

In the television receiver according to this invention (Claim 1), the schedule creation means creates the operation schedule on the basis of the receiving time detected by the program information/receiving time detection means, and the control means controls reception, recording, and playback, whereby the last part of the reserved program is recorded and the recorded part is played back just before the next broadcast of the program starts. This playback of the recorded part becomes advance notice of starting reception of the reserved program, which reminds the user that he/she has reserved the predetermined program, so that the user can prepare to watch the program by the broadcast start time.

A television receiver according to the invention (Claim 2) is a television receiver as described in Claim 1, wherein the program information/receiving time detection means comprises program table storage means for storing the program table received by the reception means; time notification means for notifying the present time; analysis means for analyzing the reception history on the basis of the output from the control means, the program table stored in the program table storage means, and the present time from the time notification means; and program specifying information creation means for outputting the program information for specifying the predetermined program on which a reservation for reception has been set, on the basis of the reception history, the program table stored in the program table storage means, and the output from the operation means.

In the television receiver according to the invention (Claim 2), the program information/receiving time detection means detects the receiving time on the basis of the broadcast start time and the reception end time which are obtained from the program table and the reception history, and the receiving time so detected can be used as the time during which the predetermined program is actually broadcast, when creating the schedule. Therefore, the user can reserve the program to receive only the real broadcast time of the program excluding a period having no relation to the program, such as a commercial break.

A television receiver according to the invention (Claim 3) is a television receiver as described in Claim 2, wherein the analysis means obtains the broadcast time of each program by analyzing the program table, and obtains the receiving time of each program on the basis of the present time and the output from the operation means, and outputs the program information corresponding to a program whose ratio of the receiving time to the broadcast time exceeds a predetermined threshold value, as received program information of a program which has been watched by the user; and the program specifying information creation means obtains the information of the predetermined program on which a reservation for reception has been set, from the program table, on the basis of the output from the operation means, and receives the received program information as the reception history on the basis of the information of the predetermined program, and outputs the following information relating to the predetermined program: a break time between the actual broadcast end time and the broadcast end time shown in the program table, the real broadcast time from the broadcast start time to the actual broadcast end time, the title, and the channel.

In the television receiver according to the invention (Claim 3), the analysis means automatically decides whether the user has watched the predetermined program or not on the basis of the ratio of the receiving time to the broadcast time, and outputs the received program information of the program which is decided as having been watched by the user. Therefore, when the user reserves reception of the predetermined program, he/she is saved the trouble of setting the playback start time and the recording start time, that is, the reservation to receive the program is automatically set using the received program information.

A television receiver according to the invention (Claim 4) is a television receiver as described in Claim 3, wherein the schedule creation means sets the recording start time at which recording of the on-air program is started, on the basis of the break time between the actual broadcast end time and the broadcast end time shown in the program table, the real broadcast time from the broadcast start time to the actual broadcast end time, and the broadcast start time, and sets the end time of this recording to the actual broadcast end time of the program.

In the television receiver according to the invention (Claim 4), since the schedule creation means sets the recording start time and the recording end time, excluding a period having no relation to the program such as a commercial break, only the last part of the broadcast of the program can be recorded.

A television receiver according to the invention (Claim 5) is a television receiver as described in Claim 3, wherein the schedule creation means sets the playback start time at which playback of the recorded program is started, on the basis of the break time between the actual broadcast end time and the broadcast end time shown in the program table, and the broadcast start time.

In the television receiver according to the invention (Claim 5), since the schedule creation means creates the schedule such that the recorded program is played back utilizing a break time just before the broadcast start time of the reserved program, the user can grasp the story of the previous broadcast of the program without being prevented from watching another program.

BEST MODE TO EXECUTE THE INVENTION

Hereinafter, an embodiment of the present invention will be described with reference to FIGS. 1 to 6.

Embodiment 1

A television receiver according to a first embodiment of the present invention records the last part of a program, and plays it back utilizing a period such as a commercial break just before the next broadcast of the program starts.

Figure 1:
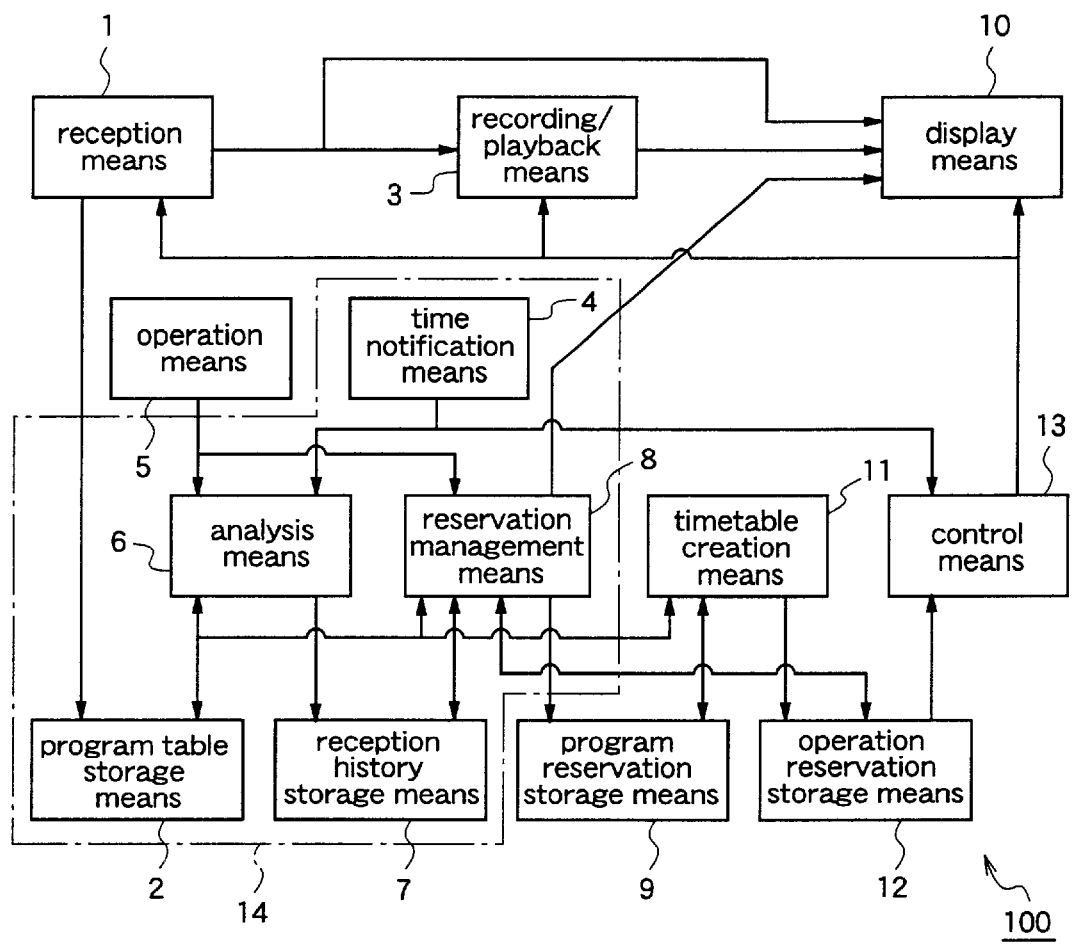
FIG. 1 is a block diagram illustrating a television receiver 100 according to a first embodiment of the present invention.

FIG. 1 is a block diagram illustrating a television receiver 100 according to the first embodiment of the present invention.

The television receiver 100 according to the first embodiment comprises a reception means 1 for receiving a program and a program table transmitted from a broadcast station; an operation means 5 for generating an operation signal for setting a reservation to receive a predetermined program according to a predetermined operation; a recording/playback means 3 for recording and playing pack the received program; a program information/receiving time detection means 14 for detecting program information to specify the predetermined program received by the user, and the receiving time of the predetermined program, on the basis of the operation signal and the program table; a display means 10 for displaying the output from the reception means 1, the recording/playback means 3, or the program information/receiving time detection means 14; a program reservation storage means 9 for storing the program information of the program which is reserved to be received; a timetable creation means 11 (schedule creation means) for creating an operation schedule of reception, recording, and playback of the predetermined program, on the basis of the detected program information and receiving time of the predetermined program, and the program table; an operation reservation storage means 12 for storing the operation schedule created by the timetable creation means 11 (schedule creation means); and a control means 13 for controlling the reception means 1, the recording/playback means 3, and the display means 10 on the basis of the operation schedule.

Further, the program information/receiving time detection means 14 comprises a program table storage means 2 for storing the program table received by the reception means 1; a time notification means 4 for outputting the present time; an analysis means 6 for detecting the receiving time on the basis of the output from the operation means 5 and the present time from the time notification means 4, and analyzing the reception history by using the detected receiving time and the program table stored in the program table storage means 2, and outputting received program information of the program watched by the user; a reception history storage means 7 for storing the received program information outputted from the analysis means 6; and a reservation management means 8 (program specifying information creation means) for outputting the program information to specify the predetermined program on which a reservation for reception is set, on the basis of the outputs from the reception history storage means 7, the program table storage means 2, and the operation means 5.

Figure 2:
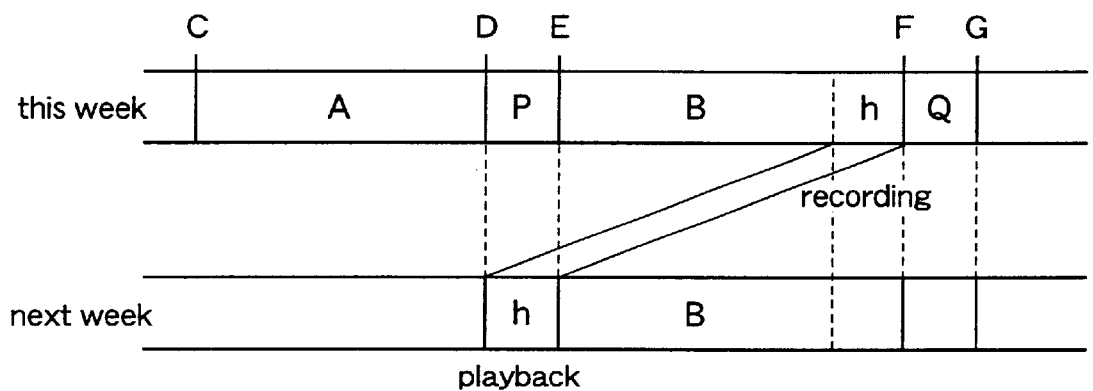
FIG. 2 is a time chart for explaining the operation of the first embodiment of the present invention.

FIG. 2 is a conceptual diagram for explaining the operation of the television receiver 100, illustrating programs extracted from a program table, in the same time zone and channel at an interval of one week.

In the time table shown in FIG. 2, a program A starts at time C and continues until time E at which the next program B starts; however, a break P that is a relatively short period to be used for commercials or messages is actually put between the program A and the program B.

Likewise, a break Q is put after the program B.

In this way, the broadcast time described in the program table transmitted from the broadcast station includes a break for commercials or messages at the last part of the broadcast time, in addition to the real broadcast time of the program. So, when the last part is recorded according to the broadcast time described in the program table transmitted from the broadcast station, the commercials or the like having no relation to the program is recorded undesirably. Therefore, the television receiver 100 according to the first embodiment of the invention is constructed such that it detects the break included in the last part of the broadcast time of the program on the program, obtains the real broadcast time of the program from the detected break time, records only the last part of the program according to the real broadcast time of the program, and plays back the recorded part just before the broadcast start time of the program in the next week.

The start time of the break can be estimated by the user operation. To be specific, the user shows a higher tendency to switch over the channel to another or turn off power to the television when the program actually ends and a commercial or a message starts than while the program is being broadcast. Utilizing this tendency, the television receiver 100 according to the first embodiment obtains the start time of the break by the user operation.

Figure 3:
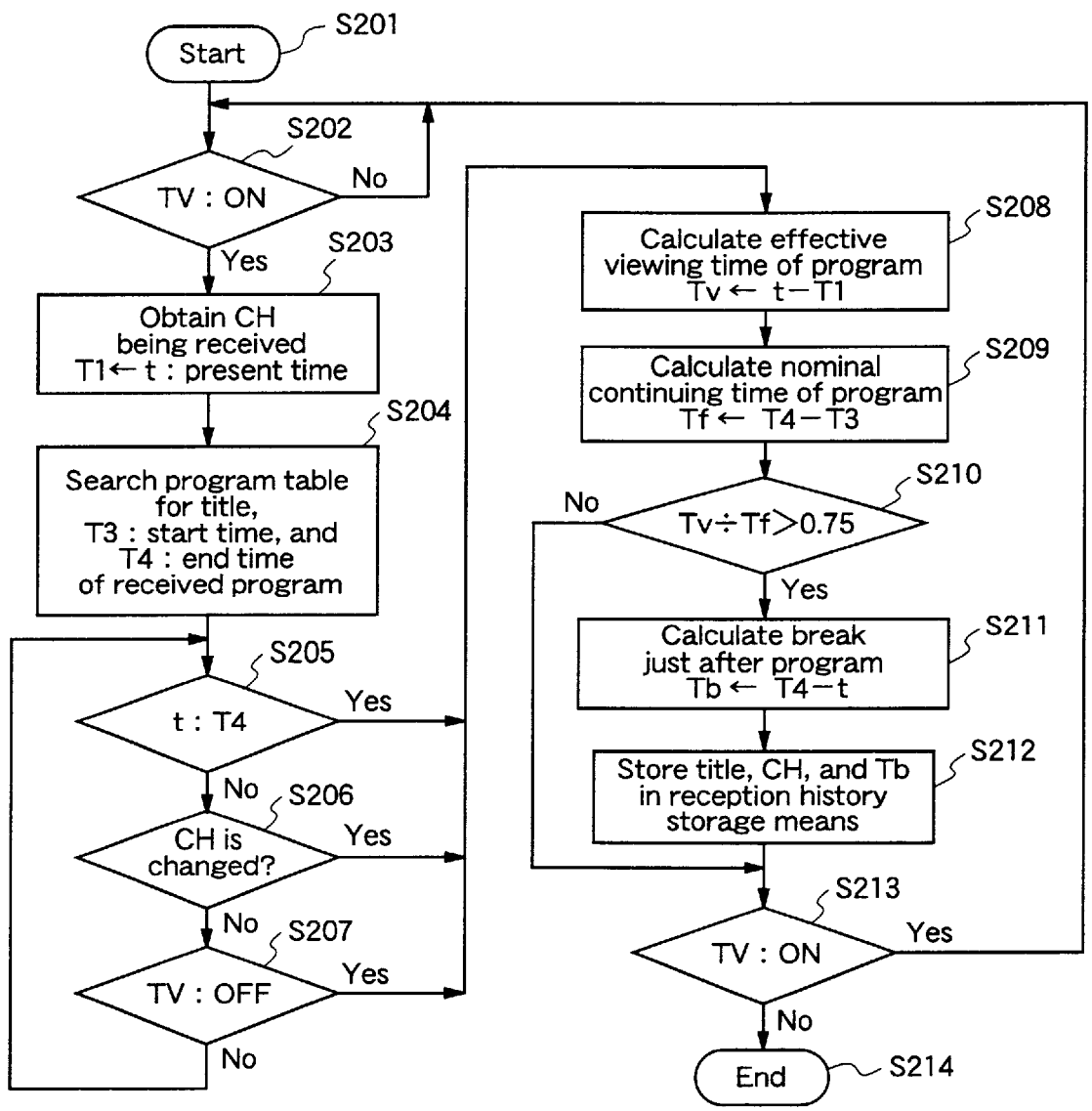
FIG. 3 is a flowchart for explaining the operation of an analysis means 6 according to the first embodiment of the present invention.

Hereinafter, the operation of the television receiver 100 according to the first embodiment will be described, starting from the operation of detecting a break between programs by the analysis means 6, according to a flowchart of FIG. 2, with reference to FIG. 1. FIG. 3 is a flowchart for explaining the procedure to detect the break by the analysis means 6.

Initially, in step S201, the analysis means 6 starts detecting the break.

In step S202, when the user turns on power to the television, the reception means 1 outputs a program to the display means 10, and outputs a program table to the program table storage means 2. On the other hand, the operation means 5 outputs an operation signal to the analysis means 6. When the user does not turn on power to the television in step S202, step S202 Is repeated until the user turns it on.

In step S203, on receipt of the operation signal from the operation means 5, the analysis means 6 obtains time t outputted from the time notification means 4, i.e., reception start time T1=t, and channel CH.

In step S204, the analysis means 6 searches the program table storage means 2 by using, as indices, the reception start time T1 and the channel CH which are obtained in step S203, and obtains the title, broadcast start time T3, and broadcast end time T4 of the program being received, followed by step S205.

In step S205, when the time t has become the broadcast end time T4 of the program, the analysis means 6 proceeds to step S208. When the time t has not yet become the broadcast end time T4, the analysis means 6 proceeds to step S206.

In step S206, when the user changes the channel, the analysis means 6 receives an operation signal from the operation means 5, and proceeds to step S208. On the other hand, when the user does not change the channel, the analysis means 6 proceeds to step S207.

In step S207, when the user turns off the television, the analysis means 6 receives an operation signal from the operation means 5, and proceeds to step S208. When the user does not turn off the television, the analysis means 6 returns to step S205.

In step S208, on receipt of the operation signal from the operation means 5 in step S206 or S207, the analysis means 6 obtains the time t outputted from the time notification means 4, i.e., the effective program reception end time, and calculates a period from the reception start time T1 to the effective program reception end time t, i.e., the effective program viewing time Tv, according to Tv=t−T1.

In step S209, the analysis means 6 calculates nominal program broadcast time Tf by using the broadcast start time T3 and the broadcast end time T4 obtained from the program table storage means 2 in step S204, according to Tf=T4−T3.

In step S210, the analysis means 6 obtains the ratio of the effective program reception time Tv to the nominal program broadcast time Tf (Tv÷Tf), and when this value exceeds three quarters, the analysis means 6 decides that the user has viewed the program, followed by step S211.

On the other hand, when the value of Tv÷Tf is lower than three quarters and so the analysis means 6 decides that the user has not viewed the program, the analysis means 6 proceeds to step S213.

When it is decided in step S210 that the user has viewed the program, in step S211, the analysis means 6 calculates a break just after the program (Tb) from the actual broadcast end time to the broadcast end time described in the program table, on the basis of a difference between the broadcast end time T4 and the effective program reception end time t, according to Tb=T4−t.

In step S212, the analysis means 6 outputs the title of the program decided as having been viewed by the user in step S210, the channel CH of the program, and the break Tb just after the program to the reception history storage means 7, and the reception history storage means 7 stores the title, channel CH, and break Tb from the analysis means 6 as a set of received program information, followed by step S213.

In step S213, when the television is ON, the analysis means 6 returns to step S202; when the television is OFF, it proceeds to step S214 to end the break detection.

In this way, the analysis means 6 detects the receiving time Tv of the predetermined program on the basis of the broadcast start time T3 obtained from the program table and the operation signal supplied from the operation means 5 just after the user has finished watching the predetermined program, and decides that the viewer has watched the predetermined program when the ratio of the detected receiving time Tv of the predetermined program to the broadcast time Tf of the program shown in the program table exceeds a predetermined value. Further, with respect to the predetermined program which is decided by the analysis means as having been viewed by the user, the analysis means 6 decides that the time t at which the control means 5 transmits the operation signal just after the user finishes watching the program is the start time of the break just after the program, and detects a period from the break start time t to the broadcast end time T4 shown in the program table, as the break Tb, on the basis of the break start time t and the broadcast end time T4 obtained from the program table.

Figure 4:
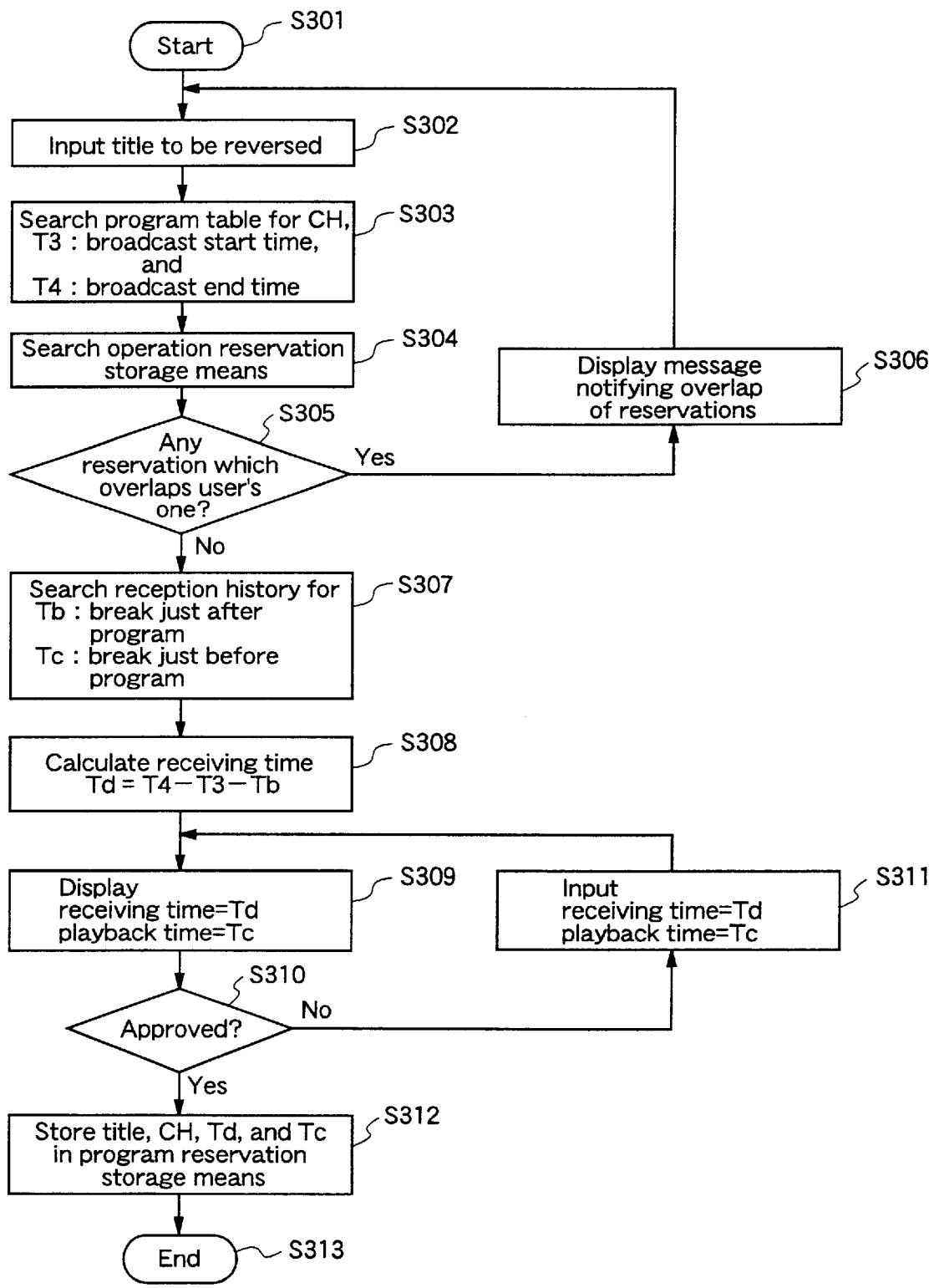
FIG. 4 is a flowchart for explaining the operation of a reservation management means 8 according to the first embodiment of the present invention.

Next, a description will be given of the operation of the television receiver 100 when it accepts a reservation from the user, according to a flowchart shown in FIG. 4, with reference to FIG. 1. FIG. 4 is a flowchart for explaining the operation of the reservation management means 8 when it accepts a reservation for a program.

First of all, in step S301, the reservation management means 8 starts to accept a reservation for a program.

In step S302, when the user specifies the title of a program to be reserved by using the operation means 5, the title of the program is output as an operation signal from the operation means 5 to the reservation management means 8.

In step S303, the reservation management means 8 searches the program table storage means 2, using the title as an index, for the channel CH, broadcast start time T3, and broadcast end time T4 o f the specified program.

In step S304, the reservation management means 8 searches the operation reservation storage means 12, using the broadcast start time T3 and end time T4 as indices, for another reservation whose broadcast time overlaps that of the reservation made by the user.

When a reservation whose broadcast time overlaps that of the user's reservation is detected in step S304, in step S305, the reservation management means 8 instructs the display means 10 to display a message informing the overlapping reservations, followed by step S306. In step S306, the display means 10 displays a message informing the overlapping reservations, according to the instruction from the reservation management means 8, followed by step S302.

When there is no reservation whose broadcast time does not overlap that of the user's reservation in step S304, the reservation management means 8 proceeds to step S307.

In step S307, the reservation management means 8 searches the reception history storage means 7 using the title, channel CH, broadcast start time T3 and broadcast end time T4 as indices to obtain received programs whose title or channel and broadcast time zone is/are equal to that/those of the reserved program, and calculates the average of the breaks just after the programs in the corresponding received program information obtained from the reception history storage means 7, thereby obtaining the break Tb just after the program. Further, the reservation management means 8 searches the reception history storage means 7 using the channel CH and the broadcast start time T3 as indices to obtain the breaks just before the programs in the same channel from the received program information, and calculates the average of the breaks just before the programs from the corresponding received program information obtained from the reception history storage means 7, thereby obtaining the break Tc just before the program.

Here, the medium value of the recorded breaks is obtained when there are plural pieces of corresponding received program information, for the purpose of suppressing deflection of data due to variation in user's behavior, or user's caprice. Further, since the time length of commercials or information is usually not changed even when a program is replaced with a new one so long as these programs are broadcast by the same channel in the same time zone, the reception information of the program in the same channel and time zone is used to obtain information about the break.

In step S308, the reservation management means 8, which has obtained the break Tb just after the program to be reserved and the break Tc just before the program, obtains the real broadcast time by subtracting the break Tb just after the program from the nominal program broadcast time Tf, as the receiving time Td of the program to be reserved, according to Td=T4−T3−Tb.

In step S309, the reservation management means 8 outputs the Td as the receiving time and the Tc as the playback time just before the reception, to the display means 10. The display means 10 displays the receiving time Td and the playback time Tc supplied from the reservation management means 8, and asks the user whether he/she approves that the receiving time is Td and the playback time is Tc in step S310.

When the user wants to correct the receiving time Td and the playback time Tc, the user corrects the receiving time Td and the playback time Tc in step S311, followed by step S309. At this time, the user may directly input the correction to the reservation management means 8 through the operation means 5.

After the user corrects the playback time Tc and the receiving time Td or after the user approves the playback time and the receiving time as they are, the reservation management means 8 proceeds to step S312. In step S312, the reservation management means 8 outputs the title, channel CH, playback time Tc and receiving time Td to the program reservation storage means 9, and the program reservation storage means 9 stores the title, channel CH, playback time Tc and receiving time Td as a set of reversed program information, followed by step S313. In step S313, the reservation management means 8 ends the operation of accepting a reservation for the program from the user.

In this way, the reservation management means 8 obtains the channel CH, broadcast start time T3, and broadcast end time T4 of the program to be reserved, from the program table storage means 2, and when there is another reservation of a program whose broadcast time overlaps that of the program to be reserved, the display means 10 displays a message informing the overlapping reservations. When there is no reservation whose broadcast time overlaps that of the program to be reserved, the reservation management means 8 obtains the break Tc just before the program and the break Tb just after the program, and substrates the break just after the broadcast ends from the broadcast time shown in the program table to obtain the receiving time (Td=T4−T3−Tb). Then, the reservation management means 8 asks the user whether the break just before the broadcast of the program starts may be used as the playback time Tc for playing the recorded broadcast and whether the real broadcast time may be used as the receiving time Td of the program to be reserved. On receipt of the user's approval, the reservation management means 8 outputs the reserved program information (title, channel CH, playback time Tc, and receiving time Td) to the program reservation storage means 9, thereby accepting the reservation of the program to be received.

Next, a description will be given of the operation of the timetable creation means 11 for creating an operation schedule, according to a flowchart of FIG. 5, with reference to FIG. 1.

Figure 5:
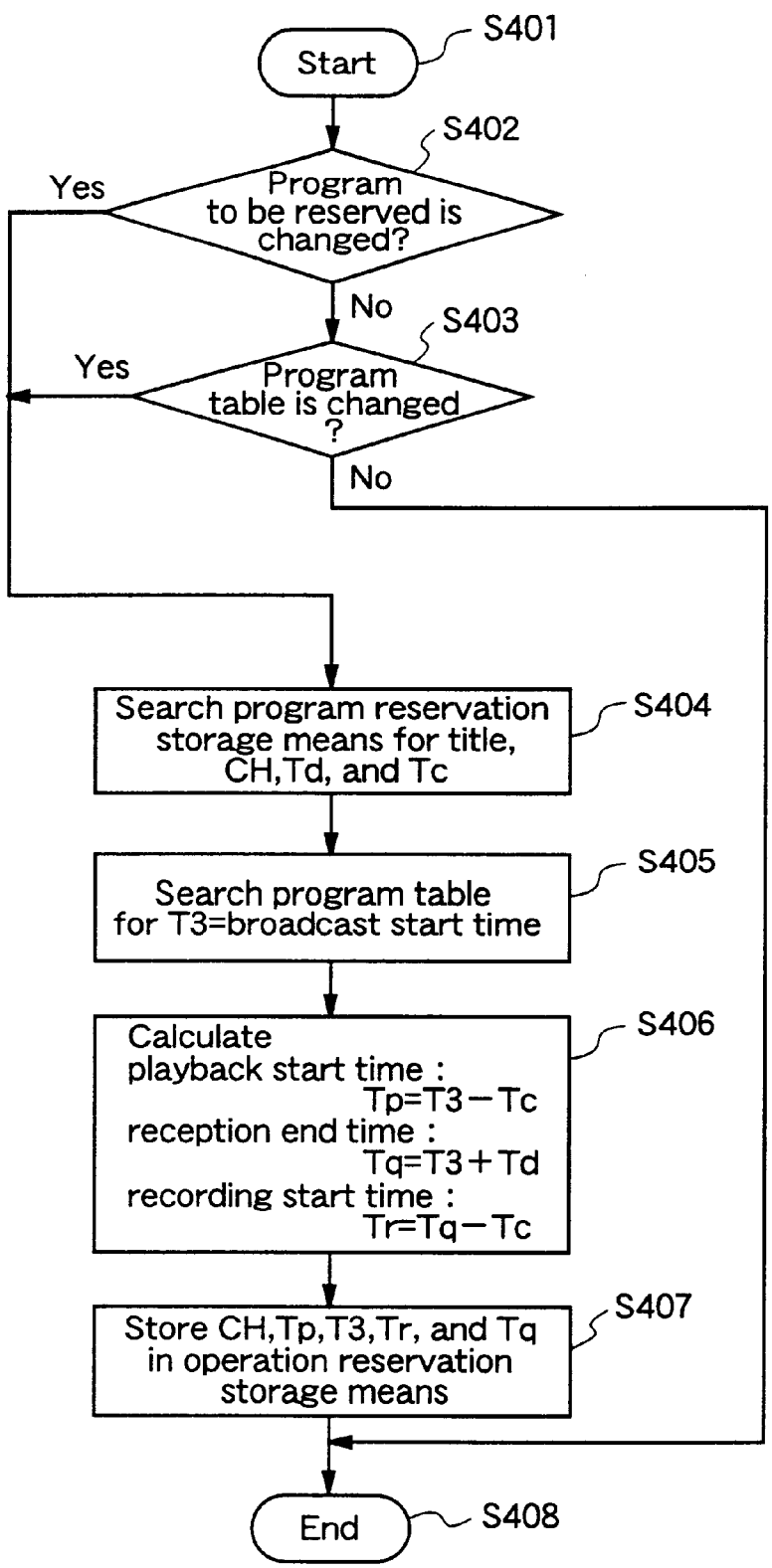
FIG. 5 is a flowchart from explaining the operation of a timetable creation means 11 according to the first embodiment of the present invention.

FIG. 5 is a flowchart for explaining the procedure when the timetable creation means 11 creates an operation schedule.

First of all, in step S401, the timetable creation means 11 starts creating an operation schedule.

The timetable creation means 11 creates an operation schedule only when the user changes the reservation or the broadcast station makes a change to the program table, i.e., when data is written in the program reservation storage means 9 or the program table storage means 2. So, the timetable creation means 11 continuously monitors the outputs from the program table storage means 2 and the program reservation storage means 9.

When data is written in the program reservation storage means 9 in step S402, the timetable creation means 11 proceeds to step S404. When no data is written in the program table storage means 2, the timetable creation means 11 proceeds to step S408 to end the creation of an operation schedule.

In step S404, the timetable creation means 11 search the program reservation storage means 9 to read the title, channel CH, playback time Tc, and receiving time Td of the reserved program, followed by step S405.

In step S405, the timetable creation means 11 searches the program table storage means 2 by using, as indices, the title and channel CH obtained in step S404 to obtain the broadcast start time T3 of the reserved program, followed by step S406.

In step S406, the timetable creation means 11 calculates the playback start time Tp=T3−Tc, the reception end time Tq=T3+Td, and the recording start time Tr=Tq−Tc, followed by step S407.

In step S407, the timetable creation means 11 outputs the channel CH, the playback start time Tp, the broadcast start time T3, the recording start time Tr, and the reception end time Tq as a set of operation reservation information to the operation reservation storage means 12, and the operation reservation storage means 12 stores the operation reservation information from the timetable creation means 11, followed by step S408.

In step S408, the timetable creation means 11 ends the creation of the operation schedule.

As described above, the timetable creation means 11 continuously monitors the outputs from the program reservation storage means 9 and the program table storage means 2, and when the user changes the reservation or the broadcast station makes a change to the program table, it calculates the playback start time Tp (Tp=T3−Tc), the reception end time Tq (Tq=T3+Td), and the recording start time Tr (Tr=Tq−Tc) by using the title, channel CH, playback time Tc, and receiving time Td obtained from the program reservation storage means 9 and the broadcast start time T3 obtained from the program table storage means, thereby creating the operation schedule for the program to be reserved.

Figure 6:
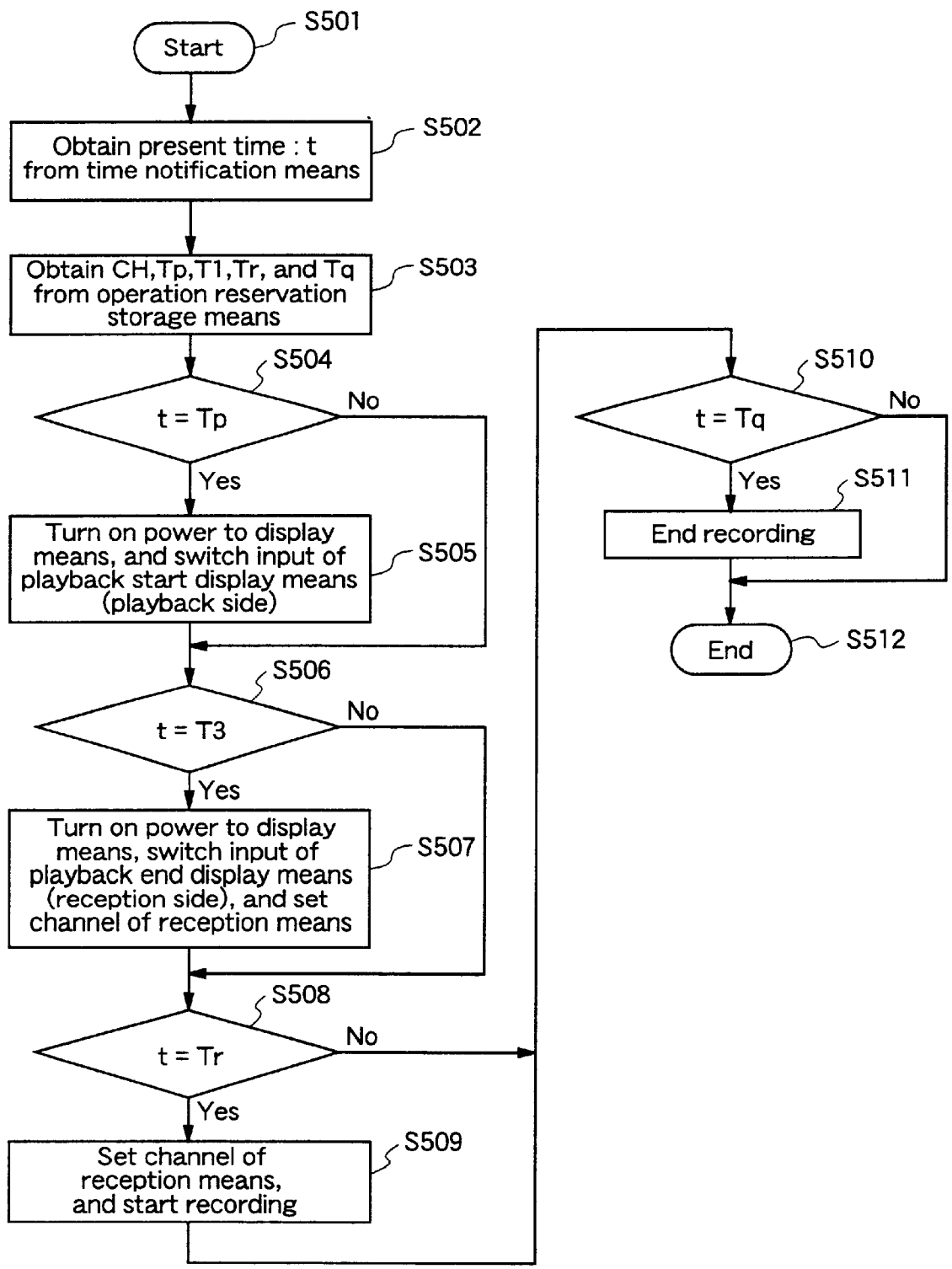
FIG. 6 is a flowchart for explaining the operation of a control means 13 according to the first embodiment of the present invention.
Figure 7:
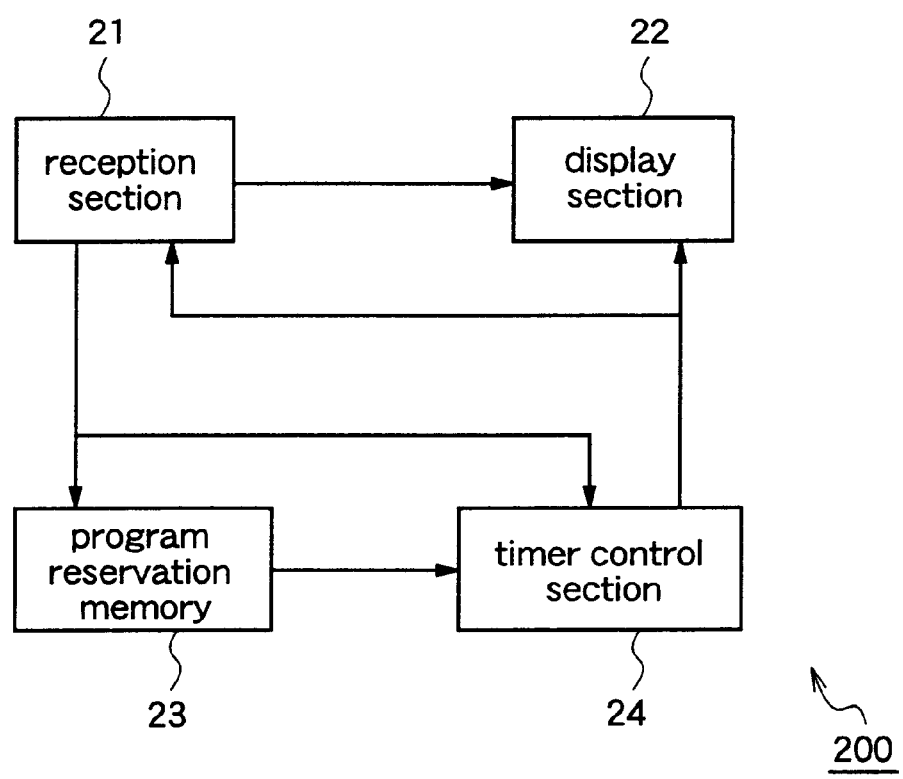
FIG. 7 is a block diagram illustrating a conventional television receiver 200.

Next, a description will be given of the operation of the control means 13 for controlling reception, recording, and playback, according to a flowchart of FIG. 6, with reference to FIG. 1. FIG. 6 is a flowchart for explaining the operation of the control means 13 when it controls reception, recording, and playback.

First of all, in step S501, the control means 13 starts the operation to control reception, recording, and playback.

The control means 13 obtains the time t outputted from the time notification means 4 in step S502, and obtains the time of the operation schedule outputted from the operation reservation storage means 13 in step S503, followed by step S504.

From step S504 and on, the control means 13 compares the time t outputted from the time notification means 4 in step S502 with the time of the operation schedule outputted from the operation reservation storage means 12 in step S503. When the time t from the time notification means 4 matches the time of the operation schedule from the operation reservation storage means 12, the control means 13 controls reception, recording, and playback so that these operations are performed according to the time of the operation schedule stored in the operation reservation storage means 12.

To be specific, when the time t and the playback time Tp match in step S504, the control means proceeds to step S505. When the time t and the playback time Tp do not match, the control means 13 proceeds to step S506. In step S505, the control means 13 instructs the recording/playback means 3 to play back the recorded part of the previous broadcast, switches the input of the display means 10 to the recording/playback means 3, and turns on the display of the display means 10, followed by step S506.

In step S506, when the time t and the broadcast start time T3 match, the control means 13 proceeds to step S507. When the time t and the broadcast start time T3 do not match, the control means 13 proceeds to step S508. In step S507, the control means 13 instructs the recording/playback means 3 to end the playback, switches the channel of the reception means 1 to a specified channel, switches the input of the display means 10 to the reception means 1, and turns on the display of the display means 10, followed by step S508.

In step S508, when the time t and the recording start time Tr match, the control means 13 proceeds to step S509. When the time t and the recording start time Tr do not match, the control means proceeds to step S510. In step S509, the control means 13 switches the channel of the reception means 1 to a specified channel, and instructs the recording/playback means 3 to start recording of the output from the reception means 1, followed by step S510.

In step S510, when the time t and the recording end time Tq match, the control means 13 proceeds to step S511. When the time t and the recording end time Tq do not match, the control means 13 proceeds to step S512. In step S511, the control means 13 instructs the recording/playback means 3 to end the recording of the output from the reception means 1, followed by step S512.

In step S512, the control means 13 ends the operation of controlling reception, recording, and playback.

In this way, the control means 13 compares the operation schedule created by the timetable creation means 11 with the present time outputted from the time notification means 4.

When the time to perform reception, recording, or playback which is set in the operation schedule matches the present time outputted from the time notification means 4, the control means 13 controls the operation of reception, recording, or playback so that the operation set in the operation schedule is performed.

As described above, in the television receiver according to the first embodiment of the present invention, the time to actually end a predetermined program on which a reservation for reception is set is detected on the basis of a signal outputted from the operation means 5 according to the user operation; a timetable operation schedule for reception, recording, and playback is created using the time at which the program actually ends, and the broadcast start time and broadcast end time shown in the program table; the last part of the broadcast of the predetermined program is recorded on the basis of the operation schedule created as mentioned above; and the recorded part of the broadcast is played back just before the next broadcast of the predetermined program starts. Therefore, by setting a reservation for reception on a predetermined program, the last part of the program is recorded while the program is being broadcast, and the recorded part is played back just before the next broadcast of the program starts. Thereby, the user is notified in advance that the reserved program will be broadcast soon, and he/she can prepare to watch the program before the broadcast start time. Further, since the user can grasp the previous story of the reversed program just before the broadcast of the program starts, he/she can empathize with the program smoothly. Furthermore, since the television receiver according to the first embodiment automatically creates the timetable operation schedule for reception, recording, and playback, the user is saved the trouble of setting the playback start time and the recording start time, whereby the above-mentioned effects are achieved while simplifying the procedure of setting a reservation by the user.

In the television receiver 100 according to the first embodiment of the invention, different memory areas into which one memory is divided or different memories are allocated to the program table storage means 2, the reception history storage means 7, the program reservation storage means 9, and the operation reservation storage means 12, respectively. Further, the analysis means 6, the reservation management means 8, the timetable creation means 11, and the control means 13 are implemented by programs operated on a microprocessor, and each program is set on the same memory as the program table storage means 2, the reception history storage means 7, the program reservation storage means 9, and the operation reservation storage means 12, or it is set on an independent memory. Further, the recording/playback means 3 performs either analog recording or digital recording of a program. The recording/playback means 3 need not be included in one unit together with other means, and it may be combined with an independent unit such as a VTR. Likewise, the display means 10 need not be included in one unit together with other means, and it may be combined with an independent unit such as a television set.

APPLICABILITY IN INDUSTRY

As described above, when the television receiver according to the present invention receives a serialized TV program which is reserved, the receiver records the last part of this program, and plays back the recorded Last part just before the next broadcast of the program starts. Thereby, the user is notified in advance that the reserved program will be broadcast soon, and he/she can grasp the previous story of the program and empathize with the program smoothly. Therefore, this television receiver is of a great value as one having a function of reserving and receiving a serialized TV program to be broadcast over several times.

What is claimed is:

1. A television receiver having a function of reserving and receiving a serialized TV program to be broadcast over several times, comprising:

reception means for receiving a program and a program table which are transmitted from a broadcast station;

operation means for generating an operation signal for setting a reservation to receive a predetermined program, according to a predetermined operation;

recording/playback means for recording and playing back the received program;

program information/receiving time detection means for detecting program information for specifying the predetermined program received by a user, and the receiving time of the predetermined program, on the basis of the operation signal and the program table;

display means for displaying the output from the reception means, the recording/playback means, or the program information/receiving time detection means;

schedule creation means for creating an operation schedule for reception, recording, and playback of the predetermined program, on the basis of the detected program information and recording time of the predetermined program, and the program table; and control means for controlling the reception means, the recording/playback means, and the display means on the basis of the operation schedule;

wherein, when the predetermined program on which a reservation for reception has been set is broadcasted, the last part of the broadcast is recorded, and the recorded part of the broadcast is played back just before the next broadcast of the predetermined program is started.

2. A television receiver as described in claim 1 wherein said program information/receiving time detection means comprises:

program table storage means for storing the program table received by the reception means;

time notification means for notifying the present time;

analysis means for analyzing the reception history on the basis of the output from the control means, the program table stored in the program table storage means, and the present time from the time notification means; and program specifying information creation means for outputting the program information for specifying the predetermined program on which a reservation for reception has been set, on the basis of the reception history, the program table stored in the program table storage means, and the output from the operation means.

3. A television receiver as described in claim 2 wherein:

said analysis means obtains the broadcast time of each program by analyzing the program table, and obtains the receiving time of each program on the basis of the present time and the output from the operation means, and outputs the program information corresponding to a program whose ratio of the receiving time to the broadcast time exceeds a predetermined threshold value, as received program information of a program which has been watched by the user; and said program specifying information creation means obtains the information of the predetermined program on which a reservation for reception has been set, from the program table, on the basIs of the output from the operation means, and receives the received program information as the reception history on the basis of the information of the predetermined program, and outputs the following information relating to the predetermined program: a break between the actual broadcast end time and the broadcast end time shown in the program table, the real broadcast time from the broadcast start time to the actual broadcast end time, the title, and the channel.

4. A television receiver as described in claim 3 wherein said schedule creation means sets the recording start time at which recording of the on-air program is started, on the basis of the break between the actual broadcast end time and the broadcast end time shown in the program table, the real broadcast time from the broadcast start time to the actual broadcast end time, and the broadcast start time, and sets the end time of this recording to the actual broadcast end time of the program.

5. A television receiver as described in claim 3 wherein said schedule creation means sets the playback start time at which playback of the recorded program is started, on the basis of the break between the actual broadcast end time and the broadcast end time shown in the program table, and the broadcast start time.

* * * * *